US010717207B2

(12) United States Patent
Vialle

(10) Patent No.: US 10,717,207 B2
(45) Date of Patent: Jul. 21, 2020

(54) 3D PRINTER

(71) Applicant: Gregory D. Vialle, Centennial, CO (US)

(72) Inventor: Gregory D. Vialle, Centennial, CO (US)

( * ) Notice: Subject to any disclaimer, the term of this patent is extended or adjusted under 35 U.S.C. 154(b) by 161 days.

(21) Appl. No.: 15/648,913

(22) Filed: Jul. 13, 2017

(65) Prior Publication Data

US 2018/0111364 A1 Apr. 26, 2018

Related U.S. Application Data

(60) Provisional application No. 62/411,906, filed on Oct. 24, 2016.

(51) Int. Cl.
| | |
|---|---|
| *B28B 13/02* | (2006.01) |
| *B29C 67/24* | (2006.01) |
| *B33Y 70/00* | (2020.01) |
| *B28B 1/00* | (2006.01) |
| *C04B 28/34* | (2006.01) |
| *B33Y 30/00* | (2015.01) |
| *B33Y 10/00* | (2015.01) |
| *C04B 111/00* | (2006.01) |

(52) U.S. Cl.
CPC .......... *B28B 13/0245* (2013.01); *B28B 1/001* (2013.01); *B29C 67/247* (2013.01); *B33Y 70/00* (2014.12); *C04B 28/34* (2013.01); *B33Y 10/00* (2014.12); *B33Y 30/00* (2014.12); *C04B 2111/00181* (2013.01)

(58) Field of Classification Search
CPC ......... B33Y 10/00; B33Y 70/00; B33Y 30/00; C04B 28/34; C04B 2111/00181; B28B 1/001; B28B 13/0245; B29C 67/247
See application file for complete search history.

(56) References Cited

U.S. PATENT DOCUMENTS 4,378,203 A * 3/1983 Nayagam .............. B28B 7/0032
249/127
6,814,823 B1 11/2004 White
(Continued)

OTHER PUBLICATIONS

Dr. James Gardiner, "Revolutionizes Construction and Coral Reefs Through 3D Printing", "https://3dprint.com/152028/james-gardiner-freefab-3d-printing/", (Oct. 11, 2016).

*Primary Examiner* — Michael M. Robinson
(74) *Attorney, Agent, or Firm* — Goodhue, Coleman & Owens, P.C.

(57) ABSTRACT

A mobile autonomous printer includes a body, a plurality of hollow arms extending outwardly from the body, a pump system in each of the plurality of hollow arms, wherein the pump system in each of the plurality of hollow arms is switchable to extrude or take in material, and a vessel disposed within the body for mixing materials prior to deposition. Articulation of the hollow arms provides for mobility of the mobile autonomous printer. A method of building a structure includes printing portions of the structure using a plurality of printers and embedding the plurality of printers into the structure. The printers embedded in the structure may function as a network of switchable pumps. Distinct conduits constructed into the structure supply chemically reacting constituents of the material that forms the structure.

14 Claims, 2 Drawing Sheets

(56) References Cited

U.S. PATENT DOCUMENTS

| | | |
|---|---|---|
| 7,300,619 B2 | 11/2007 | Napadensky et al. |
| 8,119,554 B2 | 2/2012 | Kashani-Shirazi et al. |
| 8,636,938 B2 | 1/2014 | Bonassar et al. |
| 9,031,680 B2 | 5/2015 | Napadensky |
| 9,149,988 B2 | 10/2015 | Mark et al. |
| 9,216,547 B2 | 12/2015 | Elsey |
| 9,321,215 B2 | 4/2016 | Dudley |
| 9,327,056 B2 | 5/2016 | Bandyopadhyay et al. |
| 9,381,702 B2 | 7/2016 | Hollander |
| 9,399,320 B2 | 7/2016 | Johnson et al. |
| RE46,096 E | 8/2016 | Geist et al. |
| 2005/0136413 A1 | 6/2005 | Briggs et al. |
| 2009/0246832 A1 | 10/2009 | Wakarchuk et al. |
| 2013/0157013 A1 | 6/2013 | Huson et al. |
| 2014/0252668 A1* | 9/2014 | Austin ................ B28B 3/20 264/40.7 |
| 2014/0356556 A1 | 12/2014 | Fukunaga et al. |
| 2016/0198576 A1 | 7/2016 | Lewis et al. |
| 2017/0016244 A1* | 1/2017 | Keller ............. E04G 21/0436 |
| 2018/0071949 A1* | 3/2018 | Giles ................ B33Y 10/00 |

\* cited by examiner

3D PRINTER

PRIORITY STATEMENT

This application claims priority to U.S. Provisional Patent Application 62/411,906, filed on Oct. 24, 2016, entitled 3D PRINTER, hereby incorporated by reference in its entirety.

FIELD OF THE INVENTION

The present invention relates to additive manufacturing. More particularly, but not exclusively, the present invention relates to 3D printers.

BACKGROUND

Construction of buildings is traditionally a manual process. Recent advances in additive "3D" manufacturing technology promise to reduce the cost of construction substantially, by autonomously printing sequential layers of a structure from the bottom up. However, current attempts to 3D print structures using Ordinary Portland Cement (OPC) are limited by the medium. OPC reacts over hours and days with water to harden. Thus, print speed is limited with OPC: too fast and wet cement will collapse under its own weight, too slow and the layers will not adhere well to each other. Mixed OPC slurry pumped through the gantry must be used before it hardens in the conduits. These systems mostly utilize 3-axis gantry designs, in large part to support the weight of the conduits and wet cement being supplied to the print head. The structure size is then limited by the size of the gantry which defines the area of the print bed, as well as the maximum height of the structure. Many potential construction sites have limited access that may not support the delivery of large gantry systems.

Alternative cement chemistries utilizing two slurries that do not react until combined already exist commercially, albeit not yet very competitively with OPC. One example of such a chemistry is a basic magnesia (MgO) slurry (Part B) and a mild acid phosphate (e.g., KH2PO4) slurry (Part A) which can react to form a hard cement in minutes. These slurries may also contain other fillers to control for viscosity and add strength or reduce the cost of the material. Such chemistries, due to their exothermic nature and fast cure may not always work well when poured in bulk form (i.e., traditional OPC construction methods), but lend themselves well to 3D printing methods. Although seemingly unrelated to one not having the benefit of this disclosure, various polymer epoxy systems wherein a "PART B" hardening agent is mixed with a "PART A" resin would also lend themselves to a methodology which eliminates the limitations of gantry systems. While bulk polymers have not historically been used in construction, the methodology claimed herein may promote the adoption of polymer materials as a part or whole in building scale structures.

SUMMARY

Therefore, it is a primary object, feature, or advantage of the present invention to improve over the state of the art.

It is a further object, feature, or advantage of the present invention to provide for combining materials in small quantities at the print head of a 3D printer seconds before deposition to provide an optimal material for construction of buildings or other structures.

It is a still further object, feature, or advantage to provide gantry-less options not available for OPC printing systems.

Another object, feature, or advantage is to provide a method of making a structure that uses 3D printers differently at different stages in the process.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect a mobile autonomous printer is provided. It includes a body, a plurality of hollow arms extending outwardly from the body, and a pump system in each of the plurality of hollow arms, wherein the pump system in each of the plurality of hollow arms is switchable to extrude or take in material. It further includes a vessel disposed within the body for mixing materials prior to deposition. Articulation of the hollow arms provides for mobility of the mobile autonomous printer.

According to another aspect, a method of building a structure includes printing portions of the structure using a plurality of printers, each of the printers comprising at least one switchable pump for extruding or taking in materials for use in building the structure. The method further includes embedding the plurality of printers into the structure. The printers while embedded in the structure function as a network of switchable pumps.

According to another aspect, a method of building a structure is provided. The method includes printing a plurality of layers of the structure using a plurality of mobile autonomous printers, wherein each of the mobile autonomous printers comprises (a) a body, (b) a plurality of hollow arms extending outwardly from the body, (c) a pump system in each of the plurality of hollow arms, wherein the pump system in each of the plurality of hollow arms is switchable to extrude or take in material, and (d) a vessel disposed within the body for mixing materials prior to deposition. The method further includes embedding the plurality of the mobile autonomous printers into the structure as the structure grows to provide a switchable network of pumps.

BRIEF DESCRIPTION OF THE DRAWINGS

Illustrated embodiments of the disclosure are described in detail below with reference to the attached drawing figures, which are incorporated by reference herein.

DETAILED DESCRIPTION

A small mobile autonomous printer (SMAP) with limited carrying capacity of raw materials is provided, wherein the SMAP may include a body and a plurality of configurable hollow arms. The terms "printer, "3D printer", or "mobile autonomous printer" or terms may be used herein to refer to such a device. Each arm may contain a pump system capable of running in either direction (switchable) to extrude or take in material. Mobility of the SMAP units may be accomplished purely through articulation of the arms, or through the attachment of grippers or wheels. Where wheels are used, rails may be printed into the structure. The body of the SMAP may include a vessel in which two or more slurries may mix.

In operation, the apparatus may locally print layers progressively in the general fashion of additive manufacturing, but may also print a conduit system into the structure such that the constituent slurries can be supplied independently throughout the structure, including, importantly, to the location(s) of one or more SMAP units. As the structure grows, SMAP units may be embedded within the structure to create a switchable network of pumps. Holding tanks for raw materials may be built into the structure also (as encapsulated voids), reducing the need to have free standing storage containers on site as well. SMAP units at the active printing surfaces may connect pump arms to the conduits to receive the respective constituent slurries, and use other pump arms to deposit mixed (and actively setting) material onto the structure. SMAP units may be individually powered, or may extract power from an electrical network also embedded into the structure. Both the fluid conduit system and electrical conductors used by the SMAP units may be coincident or independent of systems such as plumbing systems and electrical system used in the completed structure, where the structure is inhabited.

The structure itself may also include features to enable mobility of the SMAP units. These may take the form of: insertion pockets for arms to use while climbing; permanent magnets (which may also be used as fiducial markers within the structure for surveying/positioning purposes); grips; rails; or other structures. Rails and conduit may coincide or be separate. Conduit may be selectively printed layer-wise, or with a special nozzle, producing a hollow monolithic pipe extrusion, or one filled with a support material that is later dissolved or melted leaving a hollow usable pipe.

Figure 1:
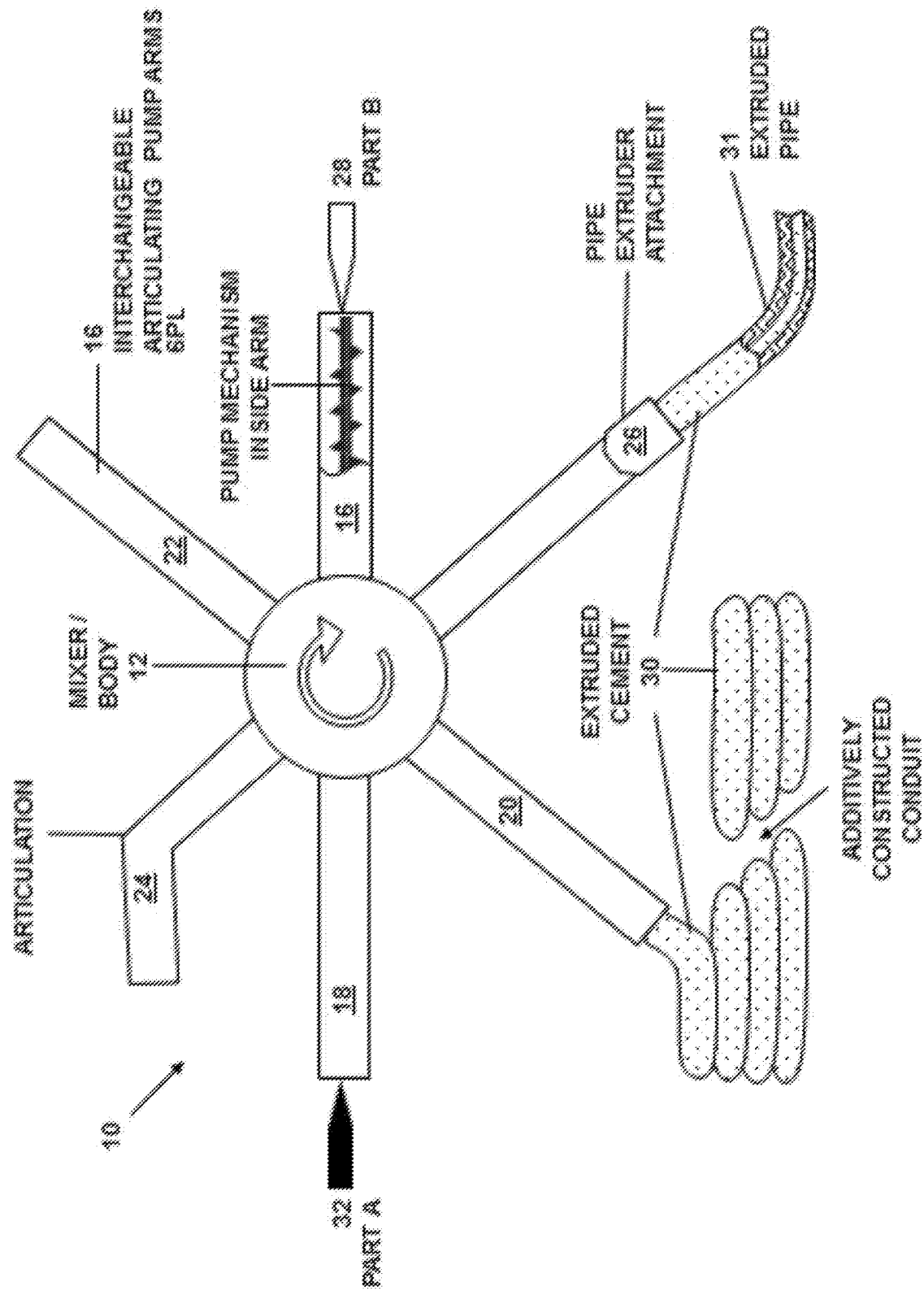
FIG. 1 illustrates one example of a small mobile autonomous printer.

FIG. 1 illustrates one example of a SMAP unit 10. The unit 10 has a body 12 which contains a vessel disposed therein. The vessel of the body 12 may be used for mixing materials prior to deposition. In addition, the body 12 may be used to house electronics including sensors, control logic, communications electronics, power sources, or other component parts. There are a plurality of hollow arms 16, 18 20, 22, 24, 26 positioned around the body. Although six are shown, other numbers may be used. The arms may be articulating arms with articulation of the arms 16, 18 20, 22, 24, 26 providing for mobility of the unit 12. While FIG. 1 shows only one simplified articulation joint, each arm may have sufficient joints to position and orient the arms in such a way so as to achieve the claims stated herein. In at least a subset of the plurality of arms there is a pump system. The pump system is preferably switchable to extrude or take in material. As shown in FIG. 1, arm 16 is used to pump in the part B constituent 28 and arm 18 is used to pump in the part A constituent 32. The two constituent parts may then mix within the body 12 and be extruded through arm 20 to provide the extruded material 30. Any number of different chemistries are contemplated for the constituents. For example, one example of such a chemistry is an alkaline magnesia (MgO) slurry and a mild acid phosphate (e.g., KH2PO4) slurry which can react to form a hard cement in minutes. Additional materials may be mixed into the base constituents for a variety of different purposes including structural, radiation shielding, or to otherwise alter mechanical, electrical, chemical, or other properties of the mixture. Also, instead of slurries, liquids or fluids of various types may be used. The extruded material may be formed using special nozzles 26 so as to extrude more complex shapes, such as the extruded pipe 31.

Figure 2:
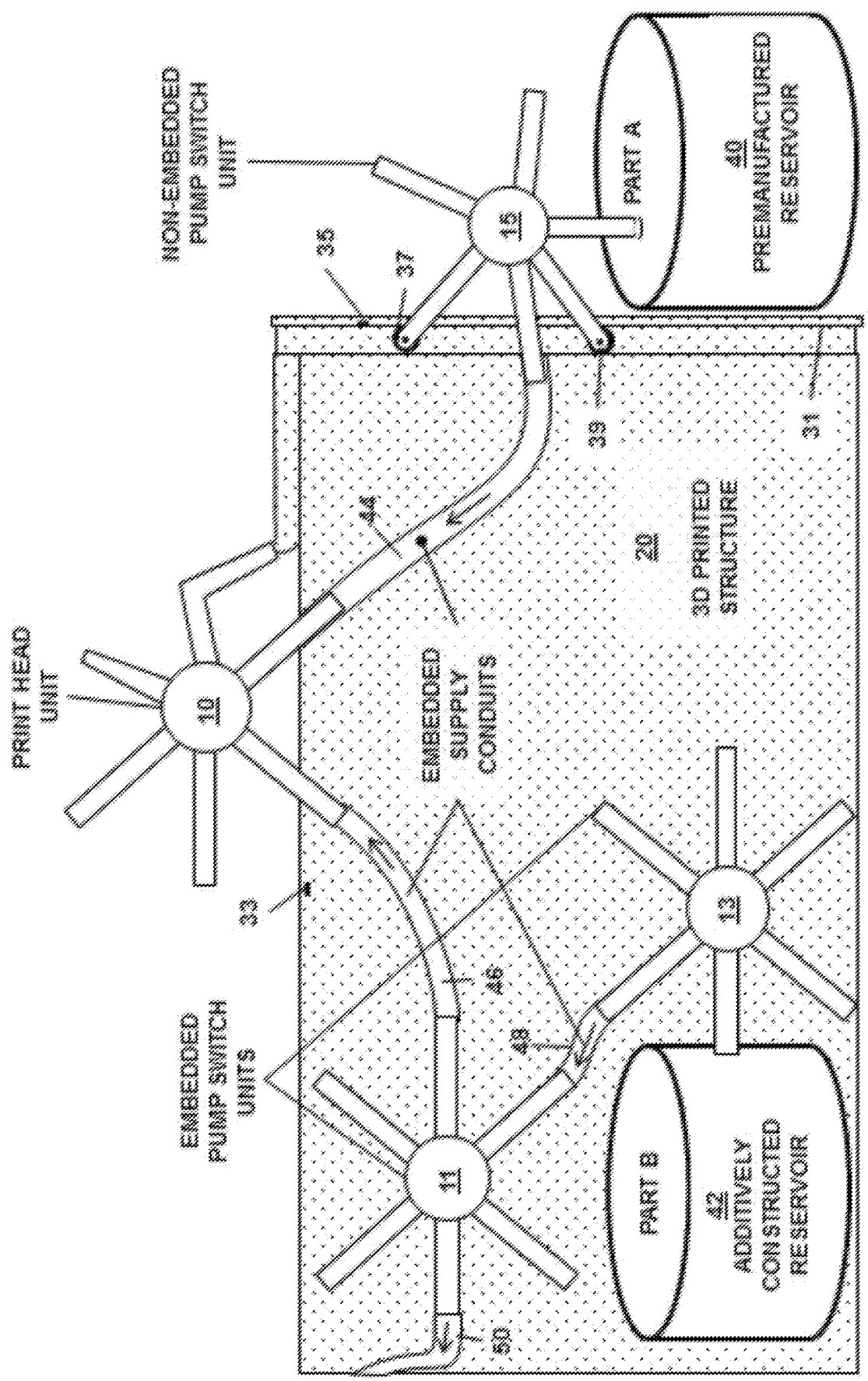
FIG. 2 illustrates a structure created using small mobile autonomous printers wherein a plurality of the small mobile autonomous printers are embedded into the structure and a supply path for constituent materials is additively constructed into the structure.

FIG. 2 illustrates an example of a structure 20 which is formed using a plurality of SMAP units 10, 11, 13, 15. As shown in FIG. 2, the structure 20 may be formed using SMAP unit 10 which prints materials while at the same time embedding itself as a part of the structure 20, as shown accomplished with units 11 and 13. Also as a part of the structure, a conduit system is built such that the constituent slurries can be supplied independently throughout the structure, including, importantly, to the location(s) of one or more SMAP units. For example, conduits 44, 46, 48, 50 are shown which interconnect different SMAP units 10, 11, 13, 15. As the structure grows, SMAP units 10, 11, 13, 15 may be embedded within the structure 20 to create a switchable network of pumps. Holding tanks for raw materials may be delivered adjacent to and connected to the structurally embedded conduit system via another SMAP, 15 as shown by the tank 40 or alternatively may be built into the structure also (as encapsulated void, 42), reducing the need to have free standing storage containers on site. SMAP units at the active printing surfaces may connect pump arms to the conduits to receive the respective constituent slurries, and use other pump arms to deposit mixed (and actively setting) material onto the structure.

SMAP units may be individually powered, or may extract power from an electrical network also embedded into the structure. Both the fluid conduit system and electrical conductors used by the SMAP units may be coincident or independent of systems such as plumbing systems and electrical system used in the completed structure, where the structure is inhabited.

The structure itself may also include features to enable mobility of the SMAP units. These may take the form of insertion pockets for arms to use while climbing, permanent magnets, grips, rails 31, or other structures. Rails may be structured for use with wheel (37 and 39) or gripper attachments on the SMAP units. Where present, rails and conduit may coincide or be separate. Conduit may be selectively printed layer-wise, or with a special nozzle, producing a hollow monolithic pipe extrusion, or one filled with a support material that is later dissolved or melted leaving a hollow usable pipe. In addition, water or other fluids may be pumped through the conduits to clean the conduits.

Permanent magnets placed into the structure may also be used as fiducial markers, 33 and 35 within the structure for surveying/positioning purposes. Magnetic sensing devices may be incorporated in the SMAP units. Positioning may also be accomplished through radio communication/triangulation with other SMAP units.

Incorporation and placement of mobility features (rails, grips, etc), fiducials, supply conduits, embedded pump location, and reservoirs may be deliberately included into the structure design or automatically integrated into the already designed structure as part of a "slicing" software program.

The invention is not to be limited to the particular embodiments described herein. In particular, the invention contemplates numerous variations in the manner in which the printer units move, the materials which are used, the types of structures built, and any number of other variations, options, and alternatives. The foregoing description has been presented for purposes of illustration and description. It is not intended to be an exhaustive list or limit any of the invention to the precise forms disclosed. It is contemplated that other alternatives or exemplary aspects are considered included in the invention. The description is merely an example of embodiments, processes or methods of the invention. It is understood that any other modifications, substitutions, and/or additions can be made, which are within the intended spirit and scope of the invention.

What is claimed is:

1. A method of building a structure, comprising:
    printing portions of the structure using a plurality of printers, each of the printers comprising at least three arms each containing a pump configured to select between extruding and taking in materials for use as active printheads in building the structure via selective deposition;
    embedding in situ a subset of the plurality of printers into the structure to provide embedded pump nodes, while a remaining portion of the plurality of the printers remain as active printhead printers;
    wherein the embedded pump nodes in the structure function together as a network to selectively transport material via in situ printed conduits to the active printhead printers for deposition onto the structure;
    wherein the active printhead printers connect pump arms to the in situ conduit network to take in material;
    wherein material mixed within a manifold mixing vessel of one of the printers is combined with material transported through another pump arm and conduit path.

2. The method of claim 1 wherein each of the printers is configured to select one or more of the at least three arms to transport the material.

3. The method of claim 1 wherein the materials comprise a first slurry and a second slurry.

4. The mobile autonomous printer of claim 3 wherein the first slurry and the second slurry react to form a cement.

5. The method of claim 1 wherein the in situ printed conduits include a network of additively constructed conduits connecting the plurality of printers.

6. The method of claim 1 further comprising transporting a fluid through the conduits.

7. The method of claim 3 wherein the materials comprise liquids.

8. The method of claim 1 wherein the portions of the structure include features to enable mobility of the printers within the structure.

9. The method of claim 1 wherein the portions of the structure include holding tanks such that the holding tanks are constructed in situ within the portions of the structure, wherein the holding tanks are configured to store material prior to mixing and/or deposition.

10. The method of claim 1 further comprising embedding a permanent magnet within the structure as a fiducial.

11. The method of claim 10 further comprising performing location sensing using magnetic sensors and the fiducial.

12. A method of building a structure, comprising:
    printing a plurality of layers of the structure using a plurality of mobile autonomous printers, wherein each of the mobile autonomous printers comprises (a) a body, (b) a plurality of hollow arms extending outwardly from the body, (c) a pump system in each of the plurality of hollow arms, wherein the pump system in each of the plurality of hollow arms is switchable in order to switch between extruding and taking in material to or from a manifold, and (d) the manifold disposed within the body of the mobile autonomous printer; and
    embedding at least a subset of the plurality of the mobile autonomous printers into the structure as the structure grows to provide a selectable interconnected network of pump nodes, while a remaining subset of the plurality of the mobile autonomous printers remain as active deposition printers;
    wherein the switchable interconnected network of pumps is configured to transport the material through the structure to the active deposition printers;
    wherein at least one of the plurality of hollow arms extending outwardly from the body of each of the mobile autonomous printers further comprises an articulating joint for moving each of the mobile autonomous printers;
    wherein the structure further comprises in situ constructed holding tanks, wherein the holding tanks are configured to store the material prior to mixing.

13. The method of claim 12 wherein the structure comprises an additively constructed conduit system for conveying constituent slurries from the switchable interconnected network of pumps to the active deposition printers.

14. The method of claim 12 further comprising embedding a permanent magnet in the structure as a fiducial for use in location sensing with magnetic sensors.

* * * * *